United States Patent [19]
Maack et al.

[11] Patent Number: 5,357,549
[45] Date of Patent: Oct. 18, 1994

[54] METHOD OF DYNAMIC RANGE COMPRESSION OF AN X-RAY IMAGE AND APPARATUS EFFECTUATING THE METHOD

[75] Inventors: Hanns-Ingo Maack, Norderstedt; Ulrich Neitzel, Hamburg, both of Fed. Rep. of Germany

[73] Assignee: U.S. Philips Corporation, New York, N.Y.

[21] Appl. No.: 781,534

[22] Filed: Oct. 22, 1991

[30] Foreign Application Priority Data

Oct. 24, 1990 [DE] Fed. Rep. of Germany ....... 4037716
Jul. 5, 1991 [DE] Fed. Rep. of Germany ....... 4122264

[51] Int. Cl.$^5$ ........................................... G01N 23/04
[52] U.S. Cl. .................. 378/62; 364/413.17; 364/413.22
[58] Field of Search ............... 378/62; 364/413.22, 364/413.14–413.17

[56] References Cited

U.S. PATENT DOCUMENTS

| | | | |
|---|---|---|---|
| 4,317,179 | 2/1982 | Kato et al. | 364/515 |
| 4,675,893 | 6/1987 | Duinker et al. | 378/151 |
| 4,749,257 | 6/1988 | Klausz | 350/331 R |
| 4,839,805 | 6/1989 | Pearson, Jr. et al. | 364/413.14 |
| 4,852,002 | 7/1989 | Klausz | 364/413.13 |
| 4,918,534 | 4/1990 | Lam et al. | 358/225 |
| 5,042,077 | 8/1991 | Burke | 382/51 |

FOREIGN PATENT DOCUMENTS

| | | |
|---|---|---|
| 0158382 | 3/1985 | European Pat. Off. . |
| 0219897 | 9/1985 | European Pat. Off. . |
| 0440166 | 8/1991 | European Pat. Off. . |
| 2952422 | 4/1986 | Fed. Rep. of Germany . |

*Primary Examiner*—Paul M. Dzierzynski
*Assistant Examiner*—David V. Bruce
*Attorney, Agent, or Firm*—Jack D. Slobod

[57] ABSTRACT

The dynamic range of density or intensity values of pixels in an X-ray image is compressed in a manner preserving the range which is of primary interest for diagnosis, while still allowing recognition of detailed structure in the further ranges. This is accomplished by forming low-pass picture values (L) from input-picture values (E), determining equalizing values as a function (C) of the low-pass picture values (L) and forming output picture values by superposition of the input-picture values (E) and the equalizing values (C) . The equalizing values are chosen such that the output picture values are greater than the input-picture values (E) at relatively small low-pass picture values (L), below the range of primary interest, and the output picture values are less than the input-picture values at relatively large low-pass picture values (L), above the range of primary interest. Further, the output picture values substantially equal the input picture values for low-mass picture values (L) within the range of primary interest for diagnosis.

9 Claims, 4 Drawing Sheets

METHOD OF DYNAMIC RANGE COMPRESSION OF AN X-RAY IMAGE AND APPARATUS EFFECTUATING THE METHOD

BACKGROUND OF THE INVENTION

1. Field of the Invention

The invention relates to a method of dynamic range compression in an X-ray image, to whose picture elements digital input-picture values are assigned, as well as to apparatus for putting the method into effect.

2. Description of the Related Art

The object areas shown in an X-ray image often have large density differences. In, for example, pictures of a lung, the vertebral column and the heart have significantly higher densities for the X-rays than the lung tissue, i.e. they absorb the X-rays to a significantly greater extent. These density differences in the object result in the X-ray three-dimensional image to be converted by the X-ray image detector into intensity differences up to a factor of 10,000. Conventional X-ray films cannot cope with such a dynamic range without loss in local contrast. However, since one is only interested in a given limited dynamic range—for lung pictures, for example, in the relatively weakly absorbing lung tissue, the films are usually exposed and developed such, that this dynamic sub-range fully utilizes the dynamic range of the film. The other dynamic ranges are shown on the film with overexposure or underexposure, so that the fine contrasts present there are lost.

Contempory image detectors have a much larger dynamic range, so that they are capable of supplying data which can still be utilized as images also in dynamic range boundary regions that cannot be recorded by a conventional film. These detectors include, for example, photo-conductor layers, preferably comprising selenium, which convert the X-ray three-dimensional image into an electric charge pattern, which can be scanned by means of a charge sensor and converted picture element—sequentially into digital input-picture values. Plates coated with storage phosphors, which store the X-ray three-dimensional image as a latent image and, on being irradiated by a laser beam produce fluorescent light proportional to the intensity of the X-ray radiation also have a comparable dynamic range. Using an optical sensor the fluorescent light can be converted into an electric signal, which is subsequently digitized.

If meanwhile the input-picture values thus obtained and containing the overall dynamic range of the object are applied without further processing to a display unit producing an image thereof, then a larger portion of the information still contained in the input-picture values will be lost, when an image character is to be used which corresponds to the character of a "conventional" X-ray recording. It is indeed possible to avoid this loss of information in the areas which are not so relevant for the diagnosis by reducing the contrasts in all the image areas, but this contrast reduction which is also active in the density range which is important for the diagnosis causes a picture character deviating from a conventional recording; the majority of doctors reject such low-contrast ("faint") images.

The EP-A 158 382 which corresponds to U.S. Pat. No. 4,675,893 discloses a method in which the X-ray radiation is varied such that before passing through the area of examination by controllable attenuation elements, the intensity differences behind the examination area and before the image detector are smoothed out to a very large extent. In that case it is also possible to obtain, using a conventional X-ray film, an X-ray image which on the one hand preserves the character (in the average density range) of a conventional X-ray image, but on the other hand enables the display of detail contrasts also in the darker image portions.

SUMMARY OF THE INVENTION

The present invention has for its object, to implement a method of the type defined in the opening paragraph such, that comparable results can be obtained, without a location-dependent variation in the intensity of radiation irradiating the examination area; the input-picture values of the X-ray recording then consequently have their dynamic range determined by the density differences in the recorded object.

According to the invention, this object is accomplished in that, low-pass picture values are formed from the input-picture values, and that for each picture element an output picture value is formed such by the superpositioning of the associated input picture value and an equalizing value which depends on an associated low-pass picture value, that the output picture value exceeds the input-picture value at small low-pass picture values and is lower than the input-picture value at high low-pass picture values.

The low-pass picture values differ from the input-picture values in that, the picture information of detail structures, contained in the X-ray recording, is eliminated, that is to say that components having a high spatial frequency are suppressed. By the superpositioning of an equalizing value depending on the current low pass-picture value it is achieved that the dynamic range of the large-area (coarse) structures which have a low spatial frequency, is significantly limited. If the output-picture values are applied to a display unit (a laser imager, for example), whose transfer characteristic is adjusted such, that on processing of the input-picture values a conventional recording character would be obtained, then at an appropriate variation of the equalizing value the character of a conventional picture is also obtained in the density range relevant to the diagnosis whilst in the other density range(s) the detail structures are obtained at a reduced large-area contrast. The bright areas in the input picture, which might cause blinding of the viewer, are transferred in the output image thus produced to areas having a substantially average density, in which detail contrasts are more easily detectable. The invention is not limited to the use of input images from the image detectors mentioned in the foregoing, but is also suitable for use with X-ray recordings produced in an other manner, for example images produced by an image intensifier—television chain.

It should here be noted, that the DE-PS 29 52 422 which corresponds to U.S. Pat. No. 4,317,779 describes a method, in which low pass-picture values are formed from the digital input-picture values of an X-ray recording. These low pass-picture values are subtracted from the input-picture values, so that a high-pass picture is obtained as the difference. This high-pass picture is added to the original picture—optionally after having been multiplied by a factor greater than 1. The effect of this what is denoted as the "Unsharp Masking" method is that the edges are accentuated; it does not aim at or achieve a dynamic range reduction.

A further development of the invention provides, that an equalizing function which represents the dependence of the equalizing values on the lowpass-picture values is stored in a look-up table and that for each lowpass-picture value an equalizing value is read from the look-up table. This renders it possible to assign, for predetermined lowpass-picture values, the associated equalizing value very rapidly to the individual picture elements of an X-ray recording.

In a still further embodiment it is provided that the parameters of the equalizing function can be set, preferably interactively, by the user, and that the equalizing function is calculated and stored in the look-up table in correspondence with the preset parameters. This renders it possible to check the effect of a change in the parameters in a monitor. The user can then interactively change the parameters, until he has obtained an optimum picture impression. Thus it is possible to collect data or to make a diagnosis on the basis of the X-ray image displayed on the display screen of the monitor, which up to now was not customary in the so-called projection radiography.

The selenium or storage phosphor layers, with the aid of which it is possible to convert an X-ray recording into digital electric signals, have the property that the picture signals produced thereby linearly depend on the intensity of the X-ray radiation at the various picture elements. A further development of the invention, suitable for detectors of this type, provides that the input-picture values of the picture signals are derived by means of a logarithmic transformation. The input-picture values derived from the picture signals which linearly depend on the intensity and are derived by means of the logarithmic transformation, linearly depend with a good approximation on the density of the object in the relevant picture element. The method according to the invention furnishes better results for the input-picture values thus depending on the density then for input-picture values which linearly depend on the intensity.

An arrangement for putting the method into effect, is characterized by the following components:

a) an image detector for converting the location-dependent radiation intensity of an X-ray recording into an electric signal, b) means for deriving the input-picture values from the signal, c) a storage device, whose storage capacity exceeds the capacity required for storing an X-ray recording, d) means for producing lowpass-picture values from the input-picture values, e) means for deriving equalizing-picture values from the lowpass-picture values, f) means for superimposing the equalizing-picture values and the input-picture values for the recovery of output-pictures values, g) a display unit displaying X-ray recording in correspondence with the output-picture values.

BRIEF DESCRIPTION OF THE DRAWINGS

The invention will now be described in greater detail with reference to the accompanying drawings, in which.

DETAILED DESCRIPTION OF THE PREFERRED EMBODIMENTS

Figure 1:
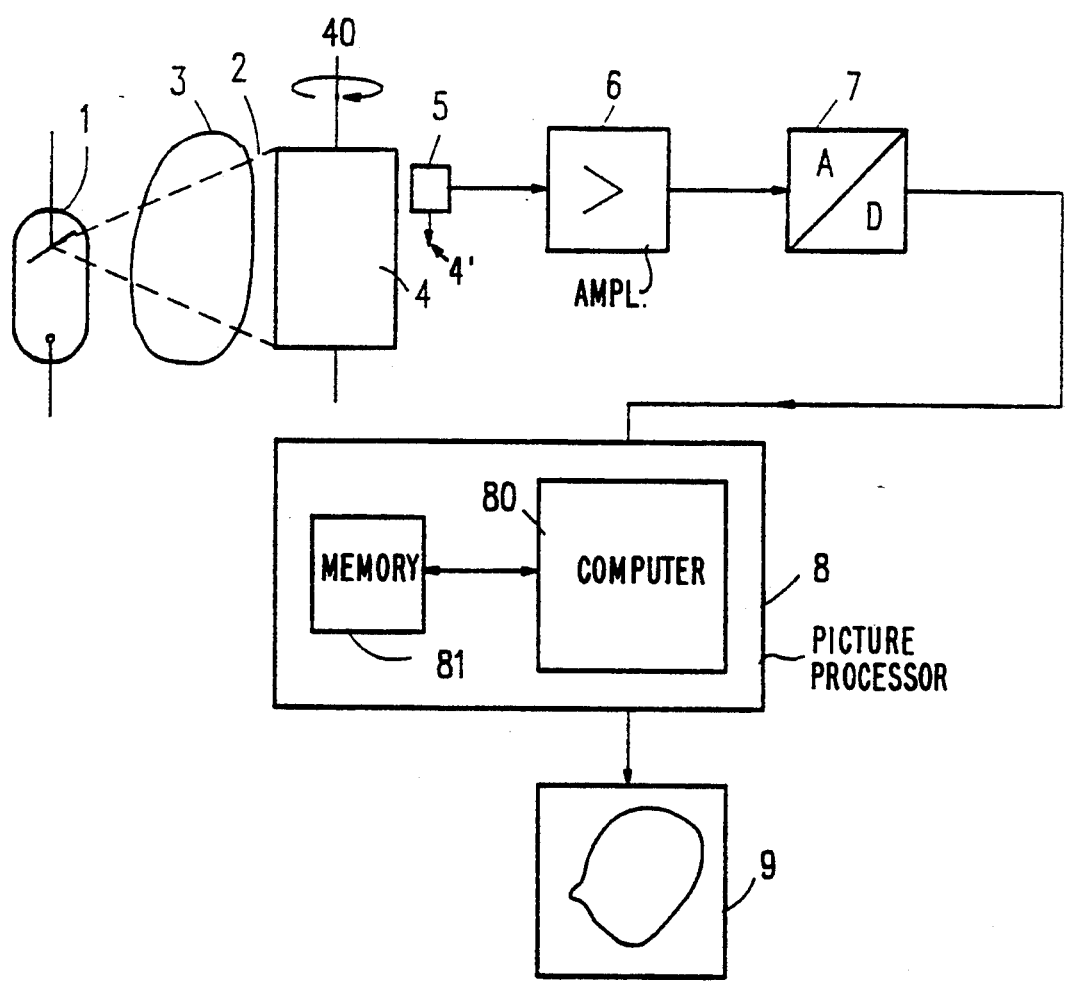
FIG. 1 is a block circuit diagram of an arrangement for putting the method into effect.

In FIG. 1 an X-ray radiator emits an X-ray beam 2 which passes through a patient 3. The X-ray three-dimensional image then produced behind the patient is converted by an image or picture detector 4,5 into an electric signal, whose variation with time corresponds to the spatial variation of the X-ray radiation behind the object.

The picture detector may, for example, include a cylindrical drum 4 which is rotatable around an axis 40 and is coated with a photo conductor—preferably selenium. The X-ray beam 2 must then have the shape of a radiation fan, in whose plane the rotary axis 40 is located. During an X-ray recording the drum rotates around the axis 40 and at the same time the fan-shaped radiation beam 2 is moved relative to the patient 3, so that during an X-ray recording a two-dimensional region of the patient is displayed on the drum surface. The X-ray radiation produces a charge pattern on the drum 4, which is converted by means of an appropriate sensor 5, which is arranged such that it is shiftable parallel to the rotary axis 40, into an electric signal. For further details of this picture detector reference is made to the EP-PS 219 897 which corresponds to Ser. No. 913,176 filed Sep. 26, 1986,abandoned, and assigned to the Assignee of the present invention.

Other types of picture detectors can alternatively be used. The only requirement is, that the picture detector produces an electric signal (or a plurality of electric signals), whose variation with time depends in some way or another on the spatial variation of the intensity of the X-ray radiation exiting the object.

The output signal of the sensor 5 is applied to an amplifier 6 and is thereafter converted in analog-to-digital converter 7 into a sequence of, for example, 16-bit-wide data words. These data words are applied to a picture processor 8, which may include a picture processor computer 80 cooperating with a semiconductor memory 81, whose storage capacity is greater than required for the storage of an X-ray recording. The picture processor 8 performs a series of processing steps, inter alia a dynamic range compression of the signals supplied by the analog-to-digital converter. As a result thereof it is possible to display the X-ray recording on a display unit 9, without loss of detail contrasts in the dark or bright picture portions. The display unit may be a monitor or a laser imager, which produces a film picture from the output signals of the picture processor.

Figure 2:
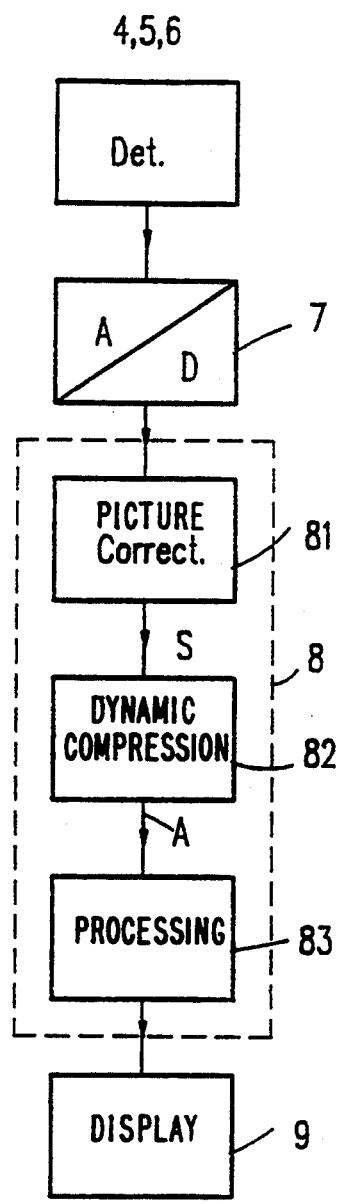
FIG. 2 shows the temporal sequence of the operations performed during picture processing.

FIG. 2 shows the time sequence of different picture processing steps in the picture processor 8. After the analog-to-digital conversion a picture correction method (block 81) is first performed, which has for its object to eliminate detector-specific errors. Such errors may result from the fact that already during scanning of the charge on the surface of the selenium drum by the sensor 5 a self-discharge occurs. When the sensor comprises a plurality of elements which simultaneously and in different places scan the drum surface, further errors may be caused by differences in sensitivity and sensitivity fluctuations. Correction methods for such picture errors are known per se, so that no further description is necessary. When other types of picture detectors are used, other correction methods must be employed. This correction method results in a dam set S, which ideally is free from detection errors.

Immediately subsequent thereto the picture dam thus obtained are subjected to a dynamic range compression (block 82) which will be described in greater detail with reference to FIG. 3. The picture data A whose dynamic was compressed in the manner described above, can then be subjected to further processing steps (block 83), for example to an edge accentuating method or an adaptation to the display unit 9, respectively.

Figure 3:
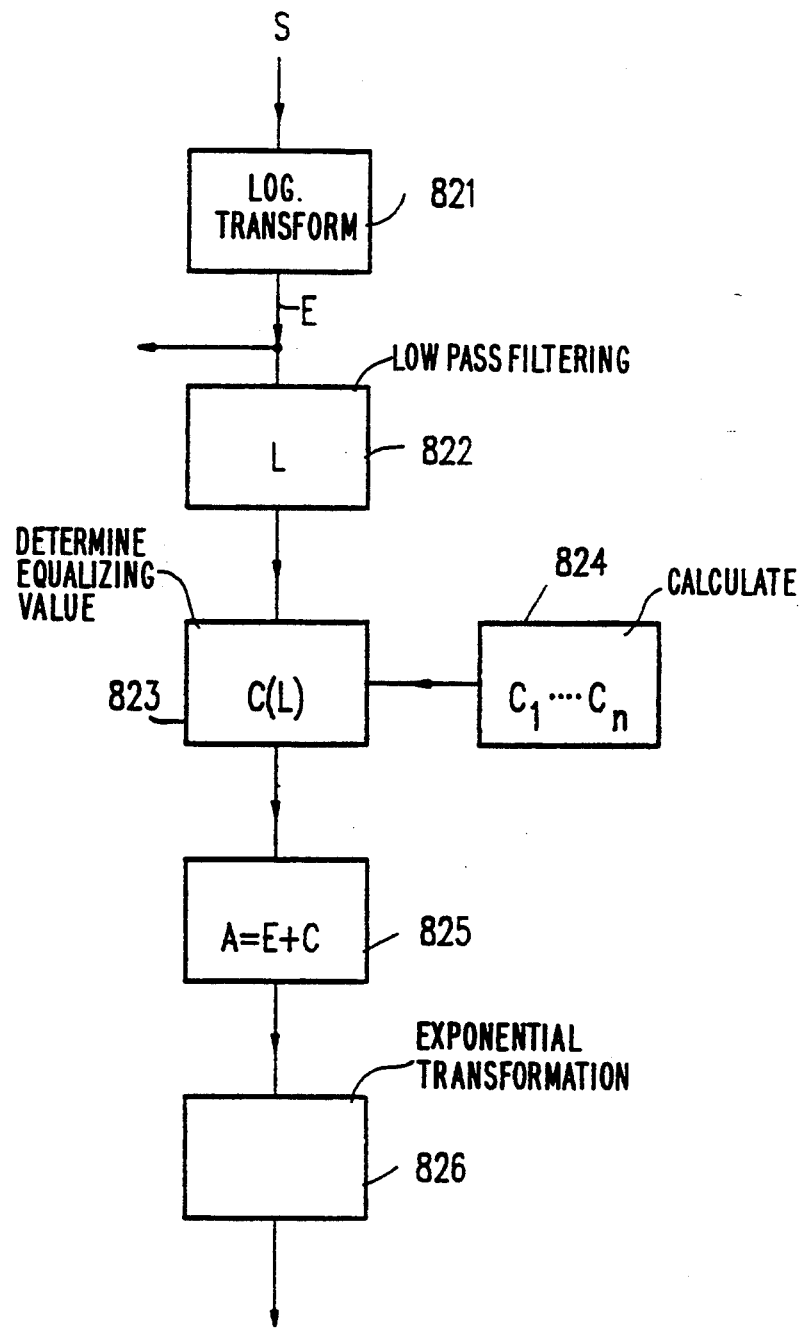
FIG. 3 is a flow chart of the dynamic range compression.

The processing operation represented by block 82 includes, as is shown in FIG. 3, first a logarithmic transformation (block 821), by which the corrected picture data S, which linearly depend on the intensity of the X-rays, are converted into data E, which at least substantially linearly depend on the density of the object at the different picture elements. This transformation can be omitted, when the picture detector supplies itself already dam which are linearly associated with the density.

The logarithmic transformation is effected in accordance with the expression $$E = Emax * \log(Smax/S) / \log(Smax). \quad (1)$$

Therein Smax is the highest possible value supplied by the picture detector, for example 30,000. Emax corresponds to the highest possible value in the density image and is set to a very high value, an integral number still representable by the computer, for example 32,000. In accordance with equation 1 the value $E = 0$ is obtained for $S = Smax$ and the value $E = Emax$ for the lowest value $S = 1$. At this choice of the transformation parameters dynamic range compression does consequently not occur. Effectively, the logarithmic transformation is effected with the aid of a look-up table which interprets the picture data S as addresses, under which the values E in accordance with the equation 1 are stored. The values produced from the values S by logarithmic transformation are denoted input-picture values hereinafter. These picture values can be applied, as is indicated by an arrow, to an external store, for example a disc store.

Basically the logarithmic transformation can, however, alternatively be effected before the digital picture dam are produced in the analog range. A logarithmic amplifier can be used for this purpose; block 821 can then be omitted.

The next step is a low-pass filtering operation (block 822). Therein, the sum of the input-picture values E is formed in known manner, which sum is assigned to the picture elements located in a preferably square sub-area of the X-ray recording, the kernel. The sum thus formed is divided by the number of picture values in the kernel and assigned to the picture element as the lowpass-picture value L, in the center of the kernel. This value consequently represents the arithmetical mean of the picture values in the kernel and the picture element. The method is repeated for other picture elements, the lowpass-picture value for a picture elements adjacent in the line direction then being obtained in known manner in that at one side a column of picture elements is added to the kernel and at the other side a column of picture elements is removed. The size of the kernel shall then be significantly larger than the detail structures relevant to the medical diagnosis and must correspond to, for example, an area of $3 \times 3$ cms.

For each picture element the input-picture value E differs from the lowpass-picture value L thus formed by a value H which depends on the intensity distribution of the X-ray recording in the relevant picture element and its environment, so that the relation $$E = L + H \quad (2)$$

holds. The value H represents the higher spatial frequency components of the input-picture value E, or from the values H of all the picture elements a high-pass picture containing the detail structures only would be formed, respectively.

Figure 4:
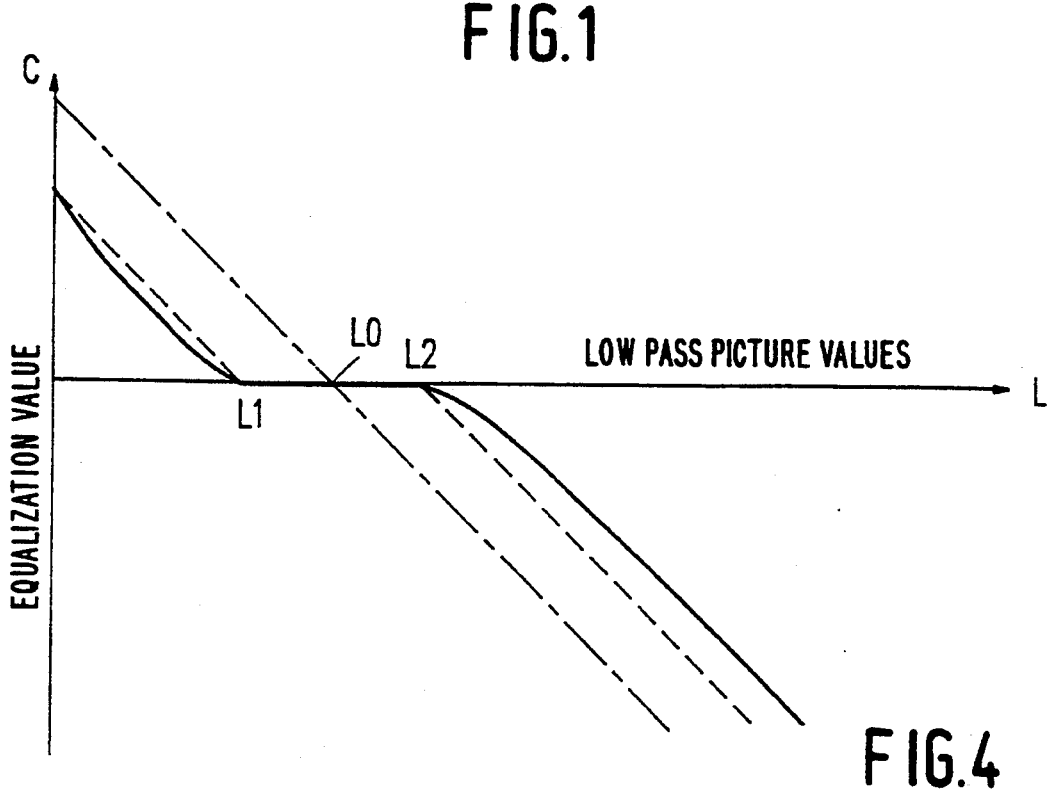
FIG. 4 shows several curves, illustrating the appropriate variation of the output-picture values versus the lowpass-picture value.

This is immediately followed by an operation (blocks 823 . . . 825), by means of which the dynamic range of only the low-pass picture is compressed at least in subareas. For each picture element an equalizing value C is determined which depends on the lowpass-picture value L and is superimposed on the input-picture value E, the equalizing values being chosen such, that in the output picture the dynamic range of the large-area structures in the area of importance for the diagnosis is influenced to the least possible extent, whilst it is compressed in the other density areas which are only of secondary interest for the diagnosis. A detailed illustration is shown in FIG. 4, which represents the equalizing function, i.e. the dependence of the equalizing value C on the lowpass-picture values L, the scale for the C-values being twice the scale for the L-values.

Let it be assumed that for, for example, lung photographs the density range relevant to the diagnosis is located between the values L1 and L2. These values can be determined by means of a histogram-analysis of a plurality of X-ray pictures of the lung and amount, for example, to $L1 = 5,000$ and $L2 = 10,000$. In the density range between L1 and L2 the compression must be as small as possible. This is achieved in that the equalizing values $C = 0$ is placed in the area of primary interest for the diagnosis.

The value C must be positive below the lower limit value L1 (if the output-picture values are formed by adding E and C together). There the equalizing values must be higher according as the difference between the limit L1 and the current value L is higher. However, the difference L1-L must not be less than the value C associated with L, to prevent the density ratios from being inverted. The curve shown in the Figure by means of the solid line and ending in the point L1, indicates an appropriate dependence of the value C on the value L. It can be described by the equation:

$$C = x1 * L1 * ((L1 - L/L1)^{y1} \quad (3)$$

wherein x1 is a factor which should not be greater than 1, whilst y1 is an exponent which should not be less than 1. The curve is based on the values $x1 = 0.5$ and $y1 = 1.2$.

For the lowpass-picture values L, which exceed L2, C must be negative, to achieve a dynamic compression in this density range. Also in this range the curve must have a strictly monotonous (falling) shape, and the difference between L and L2 must not be less than the value of C assigned to the current value of L. The solid line starting from L=L2 is defined by the relation $$C = x2 * (L_2 - \text{Emax}) * ((L - L2)/(\text{Emax} - L2))^{y2} \quad (4)$$

Also here x2 must not exceed 1 and y2 must not be lower than 1. The curves shown in FIG. 4 are based on the values x2=0.5 and y2=1.2.

In the foregoing it was assumed, that for each lung photograph the preset values L1 and L2 define the density range of primary interest for the diagnosis. This assumption is however only valid for lung photos using the same exposure times produced by an automatic exposure timer.

It is however also possible to use lung photos for which different exposure times were used, when the values L1 and L2 are adapted to the current exposure time. Since a change in dose for a lung X-ray photo only effects that the overall density values always change by the same amount, this amount only is to be superimposed on the preset values of L1 and L2 for the purpose of adaptation, so that the difference between L1 and L2 does not change even after this adaptation; it is however also possible to leave L1 and L2 unchanged and instead thereof superimpose the value with inverted sign on the lowpass-picture value. The amount which, for the purpose of adaptation to the different exposure times or different thicknesses of the patient, respectively, must be added or subtracted, can easily be obtained by analyzing a histogram representing the frequency of the different density values at the picture elements of the relevant recording. In practice such a histrogram analysis does not mean additional cost and design efforts, as they are as a rule already required for other reasons, for example for adapting the picture values to the transfer characteristics of the picture display unit.

When in the equations (3) and (4) y1=y2=1 is opted for, the curves represented by the broken lines are obtained, in which the variation C is formed by three straight line sections. The two bends in the curve at L1 and L2 are then a slight disadvantage. As is indicated by a dot-and-dash line, an appropriate variation of C can also be accomplished by means of a straight line with negative slope passing through the center (at L0) of the area which is important for the diagnosis. This straight line is obtained when in the equations (3) and (4) x1=x2=0.5; y1=y2=1 and L1=L2=L0 are opted for. This results in the equation $$C = x * (L_o - L) \quad (5)$$

wherein, for example, x=0.5. This indeed also results in some influencing of the large-area contrast in the density range relevant to the diagnosis between L1 and L2, but this influence is comparatively small.

The described dependence of the equalizing value results after the input-picture value has been superposed on it in accordance with the relation $$A = E + C \quad (6)$$

into an output picture formed from the output-picture values, that is optimal for lung photographs. The lung tissue relevant to the diagnosis is displayed with the large-area and detail contrasts customary in conventional photographs. On the other hand, the large-area coarse contrasts are reduced in the brighter and darker picture portions, whereas the detail contrasts (H) in the output picture are preserved also in these regions. This can be explained from the fact that the output-picture value A is formed by a sum from the input-picture value E which, in accordance with equation 2 includes the components H, which represent the detail structures.

The dependence of the equalizing value C, illustrated in FIG. 4, on the lowpass-picture value L is however not equally suitable for all X-ray recordings. For pictures of bones, for example, the high-density areas are of specific diagnostic significance, whereas the areas having lower densities are less important for the diagnosis. In this case the dynamic compression must be effected in the lower density range, whilst the higher density range should remain unchanged. To this end, C must increase towards lower density values (similar to the curve portion plotted at the left in FIG. 4, but starting at a higher density value) whilst C in regions of a higher density does basically not change and—to provide that the conventional picture character is preserved—must substantially be equal to zero.

It is therefore necessary to provide for the recording of different organs different degrees of dependence of the equalizing values on the lowpass-picture values. In all cases however C has as a function of L a monotonous variation, more specifically a monotonously decreasing variation when, in accordance with equation (6) E and C are added together and a monotonously increasing variation if instead thereof C is subtracted from E.

To effect the dynamic compression the equalizing value C—cf. block 823 in FIG. 3—associated with the current lowpass-picture value is determined. The simplest manner to do so is by means of a look-up table, in which for each input address—formed by the lowpass-picture values L—an equalizing value-picture value C assigned to it is stored. Since for the X-ray recordings of different organs and possibly also for photographs with different exposure times or photographs of patients of different thicknesses of the same organs, different degrees of dependence of the value C on L must be available, the variation of C occurring for the currently photographed organ must first be loaded from a store—possibly after preceding calculation (block 824).

Subsequently, for the purpose of forming output-picture values, the input-picture value and the associated equalizing value C in accordance with equation 6 are superimposed for each picture element. Basically it would however also be possible to subtract the value C from E, when the value C varies in a manner which is mirror-inverted with respect to the axis C=0. In the output picture formed by the output-picture value A the large-area contrasts are reduced—at least in the areas which are only of secondary interest for the diagnosis. As the detail contrasts remain unchanged in these areas, they are still recognizable in the output picture.

If in the equations (3) to (5) the value L is replaced by F, the relation $$F = (1-u)*E + u*L \quad (7)$$

then holding for F and u being a presettable value, then, when u exceeds 1, the detail contrasts are improved in the areas on both sides of the density range of fundamental interest for the diagnosis. For u=1, F becomes equal to L, and the detail contrasts remain unchanged. Since E substantially corresponds to L (the values H for the high-pass and detail structures, respectively, are usually small compared to the lowpass-picture values L), F substantially corresponds to the L and is identical thereto for u=1.

Although for each picture element in the X-ray recording an input-picture value E, a lowpass-picture value L and an output-picture value A must be available, it is not necessary to store all these values simultaneously, which would require three (semiconductor) picture stores. When, for example, a low-pass picture having all the values L has been calculated and stored, the input-picture values E or the lowpass-picture values L can be overwritten by the output-picture values A after C has been determined and added to E; this would consequently only require two picture stores. If the values E, which are not required for the low-pass picture, or the lowpass-picture values already calculated before the lowpass-picture has been completely calculated, then a storage capacity of not much more than required for storing one picture will be sufficient.

Optionally, the output-picture values may additionally be submitted to an exponential transformation (block 826), which cancels the logarithmic transformation (block 821); however the exponential transformation may be omitted.

Figure 5:
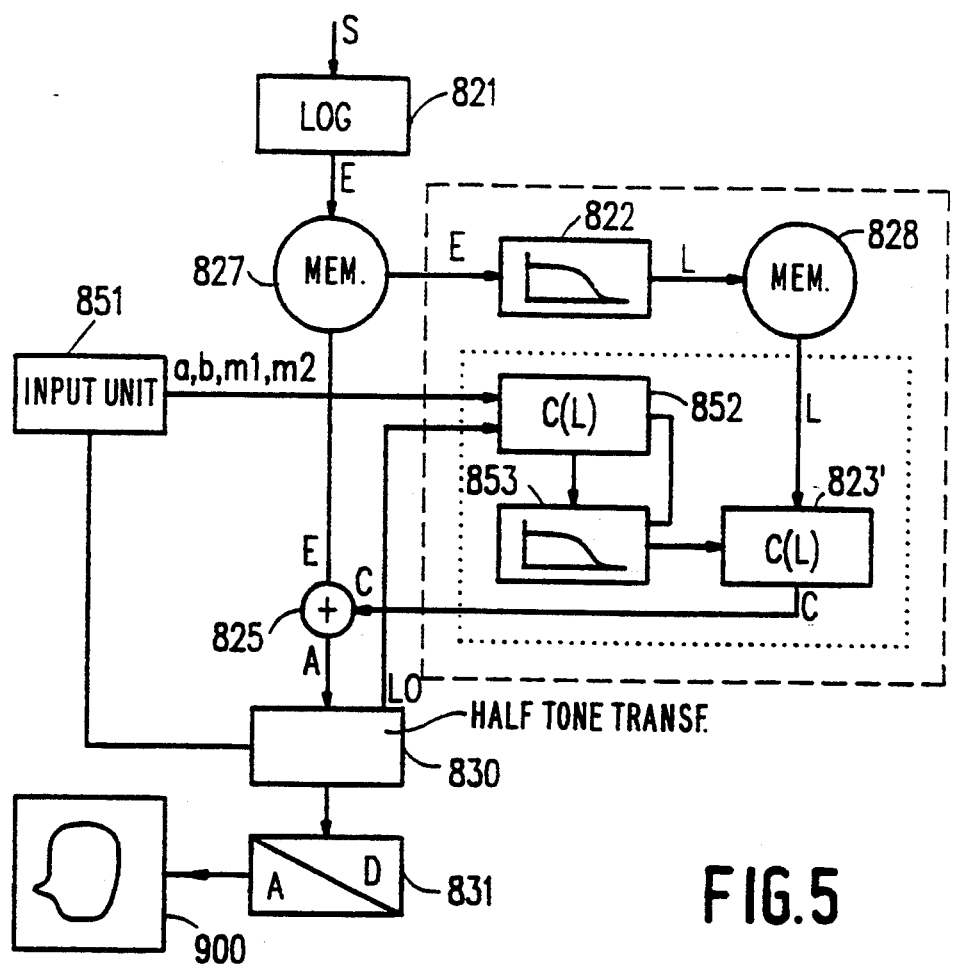
FIG. 5 is a block circuit diagram of an interactive dynamic range compression.

The foregoing explanation of the dynamic compression in accordance with the invention is based on the delivery of an X-ray recording by means of what is called a hard copy unit (laser imager). It is however alternatively possible to effect the dynamic compression on display of the X-ray recording on the display screen of a monitor. Monitors have a still smaller dynamic range than units which load the X-ray recordings on film. In an adequate performance of the compression method, i.e. when the required calculation processes are effected at a sufficiently high rate, the examiner can the perform the dynamic compression interactively, so that the X-ray recording can optimally be adapted to the dynamic range of the monitor. The user can then already obtain a result or make a diagnosis on the basis of the X-ray image appearing on the display screen of the monitor. FIG. 5 illustrates this interactive process on the basis of a schematic block circuit diagram which can be realised by means of a suitable display station, i.e. a station which in addition to a monitor has the required calculation and storage capacity available.

In accordance with FIG. 5, the corrected picture data S are submitted again in block 821 to a logarithmic transformation. The picture data S can directly be obtained from the detector 1 . . . 5 (see FIG. 1), but they can alternatively be taken from an external store. The input-picture values E obtained after the logarithmic transformation are entered into a first picture store 827.

After the interactively effected dynamic compression, still to be described, in which the output-picture values A are produced, these values are submitted to a picture half-tone transformation (block 830) via sum block 825 and applied to the monitor via analog-to-digital converter 831. The simplest manner to obtain the picture half-tone transformation is by means of a look-up table which assigns to each output-picture value A a digital value which after the digital-to-analog conversion results in a picture halftone on the display screen of the monitor 900.

Figure 6A:
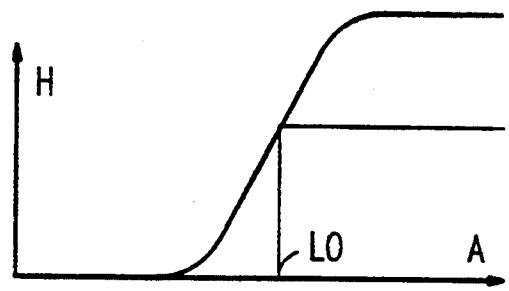
FIG. 6a is a characteristic curve of the monitor used in the interactive dynamic compression.
Figure 6B:
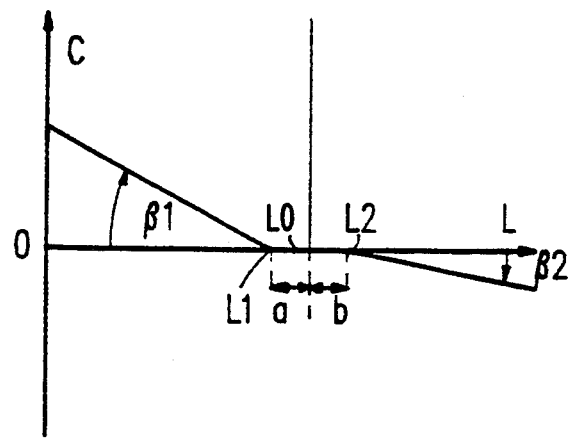
FIG. 6b illustrates an interactively adjusted equalizing function.

FIG. 6a illustrates the relation between the brightness H of a picture element on the monitor and the output-picture value A without dynamic compression. Below a first output-picture value the picture element is completely black and above a second output-picture value the picture element has its maximum whiteness. Between these values the transformation shown in FIG. 6a of the values A into a picture half-tone occurs.

Using an input unit 851, which may be a track ball, a so-called mouse or a keyboard, the unit contrast and brightness of the preset curve can be altered in a first operating mode. A change in brightnness causes a horizontal shift of the curve, and a change in contrast influences the slope of this curve. The user chooses the brightness and contrast values such, that the range of the output-picture value A is relevant to the diagnosis is located in the transition area between black and white. In this case the value A=L0 is located in the amplitude range of fundamental interest for the diagnosis.

In so far as it has been described here, the picture values processing operation shown schematically in FIG. 5 corresponds to the processing operation customary in a display station.

The dynamic range compression is performed using the processing steps and components, respectively, shown in the broken-line box. The input-picture values E are submitted, as has already been described with reference to FIG. 3, to a low-pass filtration with a fixed, comparatively large kernel. The lowpass-picture values L thus produced are stored in a second picture store 828. The lowpass-picture values L read from the second picture store are always assigned to an equalizing value, by means of a look-up table 823', in which the equalizing function C (L) has been stored, so that with the object of obtaining the output-picture value A (x,y) for each picture element the operation $$A(x,y)=E(x,y)=C(L(x,y)) \qquad (8)$$

is effected. Consequently this operation requires for each picture element, two storage accesses (to the values E(x,y) and L(x,y) in the stores 827, 828), a look-up table operation and an adding operation (in block 825). With the aid of currently customary calculation powers these operations can however be effected sufficiently rapidly.

The dynamic compression can interactively be adapted to the specific wishes of the user. To that end, the input unit 851 cooperates in a further operating mode (besides the contrast and brightness setting mode) with the dotted-line block. It is then assumed, that the equalizing function is basically composed of three straight-line sections: the first straight-line section for lowpass-picture values below L1 is defined by the angle $\beta 1$, below which this straight-line section extends to the horizontal. The angle $\beta 1$ must be less than 45°, i.e. the slope m1=tan ($\beta 1$) must, expressed in a numerical value, be less than 1. The second straight-line section from L1 to L2 is assigned to the input values which are of main interest for the diagnosis. The location of this range depends on the one hand on the exposure time of the X-ray recording and on the other hand on the organ or body region displayed in the X-ray recording. As also the brightness was interactively set, the value L0 is already present, which is located within the amplitude range of prime significance for the diagnosis. Then only the values a and b must still be preset, with which the final values of this range can be defined as follows:

$$L_1=L0-a \qquad (9)$$

$$L_2=L0+b \qquad (10)$$

The third straight section for lowpass-picture values above L2 is defined by the angle $\beta2$ or the slope $m2 = \tan \beta2$, respectively, wherein m2, expressed in a numerical value, must again be less than 1.

The user must consequently only set the values a, b, m 1 and m2. These parameters can be adjusted independently of each other, for example by "clicking " the mouse, on the display screen on the basis of an equalizing function graphically displayed on the screen. It is however alternatively possible to reduce the four parameters to two, by setting a=b and m1=m2. The two parameters then remaining can be preset by means of a bidimensional displacement with the mouse, the displacement, for example, in the x-direction changing the parameter a or b, whilst the displacement in the y-direction changes the parameters m 1 and m2. This is entirely similar to the method by means of which (in a different operating mode), the displacement in the x-direction controls the brightness and the displacement in y-direction controls the contrast.

Calculating the equalizing function is effected in the block 852. For the first straight-line section the relation $$C = m1*(L-L1)$$

is then valid and the calculation of L1 is then effected from L0 and a in accordance with equation (9). For the second straight-line section in the range from L1 and L2 it holds that C=0, and for the third straight-line section its holds that $$C = m2*(L-L2) \text{ wherein } L2 = L0+b.$$

The equalizing function can be calculated very rapidly, since only straight-line sections are involved, i.e. the equalizing function can as it were be effected in real time, when the user changes the parameters interactively.

After the calculation, the equalizing function is still "angular" discontinuous in slope, which may be disturbing in many cases. It is therefore recommendable to submit the data word sequence, which represents the equalizing function C(L) to a (unidimensional) low-pass filtration. To that end the low-pass filter block 852 is provided, the size of the low-pass kernel appropriately being derived from the width (a+b) of the amplitude range relevant to the diagnosis and being set, for example, to one tenth of this value. If, for example, L1 = 5000 and L2 = 10,000, then smoothing of the equalizing function is effected in that a mean is taken of 500 consecutive values of the equalizing function C(L). The calculated and smoothed function is loaded in the look-up table, and from there the compression is effected in accordance with the newly preset parameters. If required, these parameters can again be altered etc.

We claim:

1. A method of dynamic range compression in an X-ray image, to whose picture elements digital input-picture values are assigned, comprising the steps of forming low-pass picture values (L) from input-picture values (E), and for each picture element forming an output picture value (A) by superpositioning an associated input picture value (E) and an equalizing value (C) which depends on an associated low-pass picture value (L), such that the output picture value is greater than the input-picture value at relatively small low-pass picture values and is less than the input-picture value (E) at relatively large low-pass picture values.

2. A method as claimed in claim 1 including storing an equalizing function (C,L) which represents the dependence of the equalizing values (C) on the lowpass-picture values (L) in a look-up table and for each lowpass-picture value (L) reading an equalizing value (C) from the look-up table.

3. A method as claimed in claim 2 wherein the equalizing function has interactive user settable parameters, calculating the equalizing function and storing the equalizing function in the look-up table in correspondence with said parameters.

4. A method as claimed in claim 1 wherein for presetting of the parameters of the equalizing function, setting a range of the lowpass-picture values, within which range the equalizing function has the value 0 and an upward slope of the equalizing function is set outside this range.

5. A method as claimed in claim 1 including smoothing the equalizing function.

6. A method as claimed in claim 1 including producing picture signals which linearly depend on the intensity of the X-ray radiation and deriving the input-picture values by logarithmic transformation from the picture signals.

7. A method as claimed in claim 1 including exponential transforming that the output-picture values.

8. An apparatus for compressing the dynamic range of an X-ray image comprising:
   a) image detector means for converting location-dependent radiation intensity of an X-ray image into an electric signal,
   b) means for deriving input-picture values from the electrical signal,
   c) memory means whose storage capacity exceeds a capacity required for storing said X-ray image,
   d) means for producing lowpass-picture values from the input-picture values,
   e) means for deriving equalizing-picture values from the lowpass-picture values,
   f) means for superimposing the equalizing-picture values and the input-picture values for deriving output-picture values, and
   g) display means for displaying an image in correspondence with the output-picture values.

9. An apparatus as claimed in claim 8 wherein the means for deriving the output-picture values includes look-up table means in which, under addresses assigned to the output-picture values, equalizing-picture values are stored.

* * * * *